March 10, 1970 W. V. MILLER 3,499,331

FLUIDIC ACCELEROMETER

Filed May 29, 1967

INVENTOR.
WILLIAM V. MILLER

BY
Ronald C. Keaveney
ATTORNEY

United States Patent Office 3,499,331
Patented Mar. 10, 1970

3,499,331
FLUIDIC ACCELEROMETER
William V. Miller, Los Angeles, Calif., assignor to TRW Inc., Redondo Beach, Calif., a corporation of Ohio
Filed May 29, 1967, Ser. No. 641,786
Int. Cl. G01p 15/02
U.S. Cl. 73—515                          2 Claims

ABSTRACT OF THE DISCLOSURE

There is disclosed an apparatus capable of measuring linear acceleration along one or more predetermined axes without the use of any electrical part or circuitry or of any moving mechanical parts. The invention is based on the science of fluidics, and its operation is entirely fluid in nature. Its output signal is a differential pressure indicative of the linear acceleration to which the unit is subjected. Operation of the device is based on the sensitivity of liquid within a cylinder to a linear acceleration field parallel to the cylinder's axis. Output ports are provided at each end of the cylinder which are connected to a differential pressure sensor to provide the differential output signal. When the cylinder is accelerated axially, a linear pressure gradient is developed along its length from end to end, with pressure decreasing in the direction of acceleration. The resultant differential pressure across the cylinder is proportional to axial acceleration, and can be operated on subsequently by fluidic amplifiers and/or circuits to provide a fluid signal in any desired form, mode, or fluid media.

BACKGROUND OF THE INVENTION

This invention relates to the field of guidance and control equipment and particularly to accelerometers. Various means of measuring the acceleration of a missile, or other vehicle, have in the past been developed. Such a measurement is, of course, essential to the operation of automatic guidance systems. The prior art devices have normally involved electrical circuits or moving mechanical parts. Both of these elements have had problems associated with them with respect to weight, power requirements, quality control, reliability, and the like. Since the overall effectiveness of a missile system depends upon the guidance and control functions included in it, it is highly desirable to provide a simple, reliable, and accurate basis for measuring acceleration in a manner compatible with operation of the rest of the system.

The use of fluidic techniques is, in fact, compatible with the existing fluid control functions and, in addition, renders equipment associated with those functions insensitive to ambient radiation. The immunity of fluidic elements to environmental extremes affords a considerable advantage over electrical techniques, whereas absence of moving parts affords a considerable advantage over conventional mechanical or fluid control techniques. General discussions of the type of fluidic techniques and devices which are referred to here may be found, for example, in "Fluid Amplifiers" by Joseph M. Kirshner, published by McGraw-Hill Book Company of New York in 1966, or in a book entitled, "Fluidics," edited by Eugene F. Humphrey and Dave H. Tarumoto, and published by Fluid Amplifier Associates, Incorporated of Boston, Mass. in 1965. In spite of fairly rapid developments in the fluidic art, it does not appear that there has heretofore been developed a fluidic accelerometer which does not require moving mechanical parts or electrical circuitry.

SUMMARY OF THE INVENTION

In accordance with the present invention, a liquid filled cylinder is the basic sensing element. Each end of the cylinder is provided with an inlet port and an outlet port. Liquid is supplied from a pressurized container through a pair of proportional fluid amplifiers, one for each end of the cylinder, to prevent recirculation of flow from the high pressure end to the low pressure end of the cylinder. A feedback line is provided to each of these amplifiers so that it is controlled by the pressure at the end of the cylinder where it is located. An output line is connected to the output port at each end of the cylinder, and in turn is connected to a differential pressure sensor which provides an output signal affording a measure of the linear acceleration to which the axis of the cylinder has been subjected. This signal may then be applied to any suitable utilization circuitry such as the control system of a missile. If it is desired to provide a system which is intended for use in a gravity field and which affords a measure of the acceleration vector (rather than simple linear acceleration along a flight path in a zero gravity field), then it is only necessary to provide three similar systems along mutually orthogonal axes so that each may provide a signal which is a measure of the component of acceleration along its particular axis. Such signals can then, of course, be combined to provide a measure of acceleration vector in a manner well known in the general guidance and control art.

DESCRIPTION OF THE PREFERRED EMBODIMENTS

Figure 1:
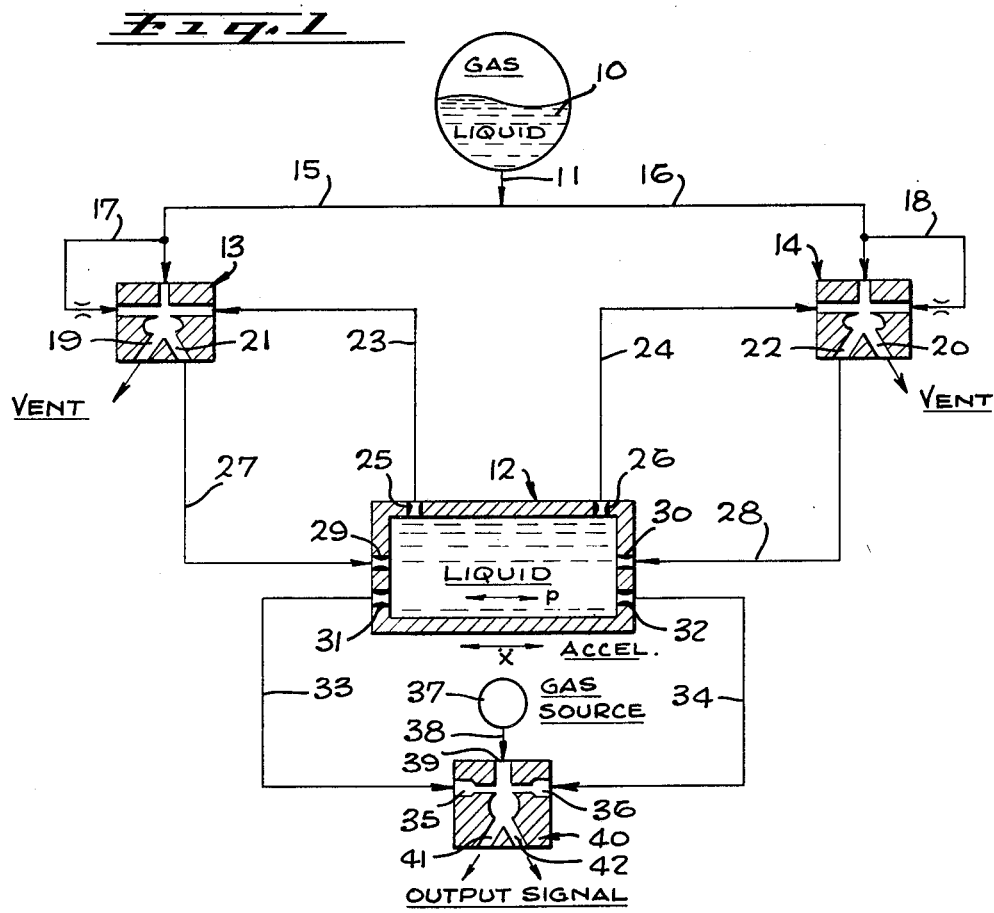
FIG. 1 is a schematic diagram of a single axis linear fluidic accelerometer in accordance with the present invention.

Turning now to the drawing and particularly to FIG. 1 thereof, there is shown a reservoir 10 for the working fluid for the system. The working fluid may, for example, be water which is stored under pressure by pressurizing helium gas contained in the cylinder with the water. Where the system is intended for use in a zero gravity field, the output of this storage tank 10 would preferably be equipped with any conventional form of flow separator so that only liquid and not gas will flow to the rest of the system. Alternatively, the reservoir 10 may structurally comprise a cylinder and piston arrangement wherein the water and gas are maintained on opposite sides of a piston which is slidable in the cylinder, the piston being urged to actuation by pressurized helium and thereby forcing the water or other liquid out of the cylinder and feeding it gradually to the remainder of the system.

It will be understood that the system shown in FIG. 1 is a continuous flow device with the liquid in the sensing cylinder 12 being continually and automatically replenished from the pressurized liquid source 10 which supplies liquid from its output line 11 to the fluid amplifiers 13 and 14, respectively, and hence to the ends of the cylinder 12. The system is placed in operation at the beginning of a missile flight or at any predetermined time when it is desired to begin operation of the guidance system of which it is a part. It then continues in operation for such time as the liquid supply in reservoir 10 lasts. Liquid once used is vented to ambient in a manner which will be obvious from the discussion below. Such a system requires no pump or other replenishment sources and is often, therefore, ideally suited for simplification and weight reduction in a missile system. Should it be desired in systems intended for other applications, it is a simple matter to provide a working fluid recirculation loop, which includes a pump in a manner which will be discussed in greater detail in connection with FIG. 2.

Pressurized fluid from the reservoir 10 is supplied through output line 11 to a branch line 15 which connects directly to the input channel or fluid amplifier 13 and through a parallel branch line 16 which connects directly to the input channel of fluid amplifier 14. A bias pressure line 17 is tapped off input line 15 and applied to one control channel of amplifier 13. A similar bias pressure line 18 is tapped off input line 16 and applied to one control channel of amplifier 14.

The amplifier 13 is provided with output channels 19 and 21 and similarly, the amplifier 14 is provided with output channels 20 and 22. The pairs of output channels in each amplifier form a Y intersection with the primary working fluid input channel to the amplifier. A pair of oppositely disposed input channels are provided in each amplifier at the branch point of the Y in order that fluid flowing through the control channels may impinge on the working fluid entering through the main input channel and deflect it to one or another of the output channels in accordance with which input channel carries the greater pressure. Thus, in the amplifier 13, the main input line 15 forms a branch point with output channels 19 and 21. The bias line 17 is connected to one control channel, whereas the opposite control channel is connected to a feedback pressure line 23, which connects a sensing port 25 at one end of cylinder 12 back to the second control channel in amplifier 13 which is disposed in direct opposition to the biasing channel to which line 17 is connected. Similarly, a feedback line 24 is connected from a sensing port 26 in the opposite end of the cylinder 12 to the control channel in the amplifier 14 which is disposed oppositely to the control channel to which bias line 18 is connected. The output channel 22 of amplifier 14 is connected by a conduit or line 28 to an input restrictor 30 in the righthand end of cylinder 12, whereas the output channel 21 of amplifier 13 is connected by a conduit 27 to an input restrictor 29 in the lefthand end of cylinder 12.

It will be seen that the structure and operation of the two amplifiers 13 and 14 are identical. In amplifier 13, output channel 19 is indicated as being vented to the ambient, whereas in amplifier 14 output channel 20 is so vented. If a recirculating system is desired, these vent channels would be connected through a pump back to the liquid reservoir.

The operative output channel 21 from amplifier 13 is connected by line 27 to input restrictor 29, whereas the operative output channel 22 from amplifier 14 is connected by line 28 to input restrictor 30 on the opposite end of cylinder 12. The bias loops 17 and 18 operate to keep the liquid flow from the input lines 15 and 16 deflected so that they exit from the amplifier 13 and 14 through the operative output channels 21 and 22, respectively, until pressure in the feedback lines 23 and 24 starts to build up and thus to deflect a portion of the working fluid streams to its respective vent channel. In this manner, as will be explained in greater detail below, the amplifiers 13 and 14 serve to prevent a recirculation of fluid from the two ends of the sensing cylinder 12 so that the pressure signal is permitted to develop therein as an accurate measure of applied acceleration $\ddot{x}$ and is not distorted by what might be called recirculation loading on the cylinder.

The cylinder 12 has a restrictor 31 forming a pressure signal output port in the lefthand end thereof and a similar restrictor 32 forming a pressure signal output port in the righthand end thereof. Port 31 is connected by line 33 to the input port 35 of a fluidic differential pressure sensor 40. Output port 32 is connected by a line 34 to the opposite input control port 36 of differential pressure sensor 40. A pressurized gas source 37 is connected by a conduit 38 to input channel 39 of the sensor 40. Gas supplied from source 37 to channel 39 is impinged upon by the fluid entering the control channels 35 and 36, which are respectively located on the left and righthand side of fluidic differential pressure sensor 40. The output channel 41 and 42 of the sensor 40 form a Y branch connection with the input channel 39 so that the gas from source 37 is divided proportionally between the Y output configuration of the channels 41 and 42 in accordance with the pressure in the lines 33 and 34, respectively, that is to say, in accordance with the pressure gradient developed in the cylinder 12 to the respective ends of which these lines are connected. The output signal from channels 41 and 42 is therefore an analog measure of the acceleration imposed upon the liquid in cylinder 12. This output pressure signal can be supplied to any fluidic system for utilization in a manner well known in the art. For example, it may be supplied to an integrating device to take the time integral of the acceleration as a measure of the velocity of the system whose acceleration is being measured.

As noted above, the device shown in FIG. 1 is a continuous flow device with liquid replenished automatically by means of a pressurized liquid source and fluid amplifiers as shown. Operation of the device is based on the sensitivity of the liquid within the cylinder to a linear acceleration field parallel to the cylinder's axis. When the cylinder is accelerated axially, a linear pressure gradient is developed along its length from end to end with pressure decreasing in the direction of acceleration. The resultant differential pressure across the cylinder is proportional to axial acceleration and can be operated on subsequently by fluidic amplifiers and/or circuits to provide a fluid signal in any desired form, mode, or fluid media. The source pressure from the reservoir 10 must always be higher than the peak pressure developed from acceleration to prevent backflow of fluid. The function of the fluid amplifiers 13 and 14, as noted, is to prevent circulation around the cylinder with a tendency to pressure equalization across it. At zero acceleration, flow through the amplifiers is equally divided between the amplifiers' output channels 21 and 22 and the vent channels 19 and 20 and liquid flows from the source through the amplifiers into both sides of the cylinder at equal flow rates, thus giving a zero differential pressure output signal. When axial acceleration is imposed, one fluid amplifier diverts more of its flow to vent while the other diverts more of its flow to the cylinder. With more flow entering one end of the cylinder and less entering the opposite end, the cylinder is maintained full of liquid. However, due to the restrictors 29 and 30 at both ends of the cylinder, the pressure differential or gradient caused by acceleration is not upset by incoming flow. Instead, it is maintained and is usable to drive downstream fluid circuitry in response to acceleration and as a measure thereof. The gain of amplifiers 13 and 14 is chosen so that their operating range prior to saturation corresponds to the required range of sensitivity of the accelerometer.

Response of the fluid in the cylinder 12 to acceleration axially therealong is such that a pressure gradient is set up along the length of the cylinder with increasing pressure in the direction opposing the acceleration. Since the ends of the cylinder are provided with output orifices 31 and 32, a pressure differential across the cylinder may be detected by connecting the fluidic differential pressure sensor 40 to these orifices by conduits 33 and 34. The differential pressure is then a linear measure of the axial acceleration. If one considers only the high pressure end of the cylinder, the pressure at that end may be expressed as $$P = \frac{\rho L}{g} \ddot{x}$$

where $\rho$ equals the liquid mass density, L equals the cylinder length, g equals the gravitational constant and $\ddot{x}$ equals the acceleration magnitude. Calculation will show that a water filled 5 inch long cylinder will have a sensitivity equal to 0.18 p.s.i.g., and a 1 inch long cylinder sensitivity will be 0.036 p.s.i.g. The cylinder's diameter has no effect on the static response for acceleration along the axis.

As noted above, the system requires a continuing replenishment of the liquid in the sensing cylinder 12. In providing for replenishment flow, the fluid amplifiers 13 and 14 are included to prevent recirculation of flow from the high pressure end to the low pressure end of cylinder 12. These amplifiers, one at either end of the cylinder, are controlled by pressure at the end where the switch is located. If acceleration is to the right, high pressure is at the left so that liquid from the storage vessel is bled or vented to ambient through outlet 19 as a result of the lefthand amplifier 13 diverting to the left due to the high pressure in line 23. Also, the pressure at the righthand side of the cylinder is low, causing that amplifier 14 to divert to its lefthand channel 22, thereby connecting the storage vessel 10 to the cylinder 12 for replenishment. The maximum cylinder pressure must, of course, be less than the storage vessel pressure, which supplies the opposing signals in lines 17 and 18 biasing the amplifiers. Also, the amplifiers and orifices must be properly sized to match outflow to inflow in a manner well-known in the art.

The system has many advantages over known devices. Mechanical motion is completely eliminated with the result that very high reliability is inherent in the device. The device has dynamic response equal to or superior to electromechanical and pneumomechanical accelerometers. It is extremely tolerant of mechanical shock and vibration environment. It is insensitive to nuclear radiation and ambient surroundings or its operating fluid. Even though these advantages are derived from the elimination of electrical or electronic circuitry as well as mechanical moving parts, the accelerometer is still applicable to measurement of a wide range of acceleration.

Figure 2:
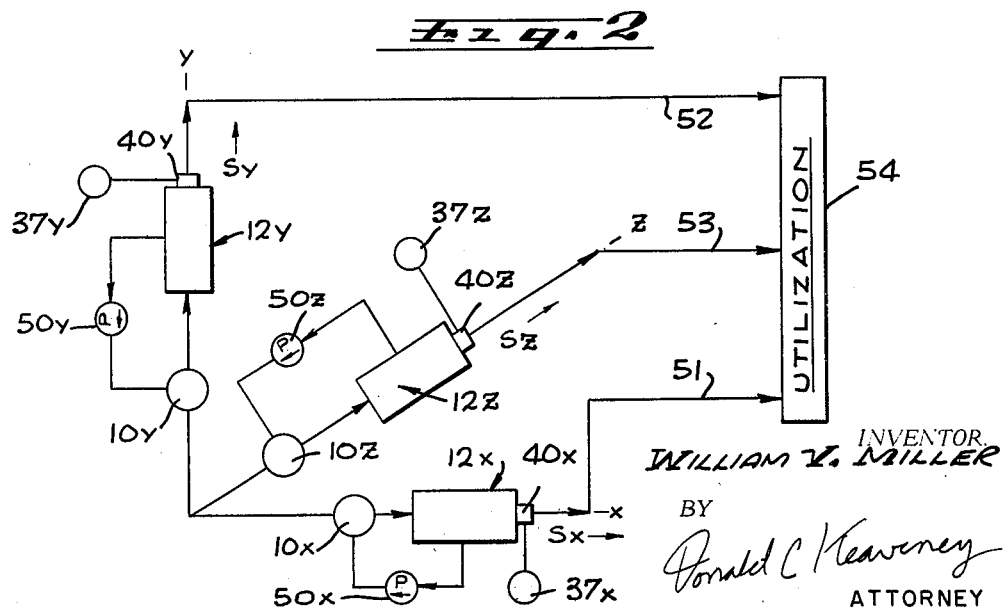
FIG. 2 is a schematic diagram illustrating the manner in which three of the systems of the type shown in FIG. 1 may be combined to provide an apparatus for measuring vector acceleration.

If it is desired to utilize this type of device in the earth's gravitational field, or in other gravitational fields where it may be important to obtain a vector rather than a scalar measure of acceleration, the system may be adapted as shown schematically in FIG. 2.

In FIG. 2 there is schematically shown a set of Cartesian orthogonal axes, $x$, $y$, and $z$, which are mutually perpendicular to each other. Each one of three identical sensing cylinders, each identical to that described in the system of FIG. 1, is positioned in any convenient manner with its axis lying along one of the three Cartesian coordinates, respectively. Thus, cylinder $12x$ has its sensing axis lying along the $x$ direction of the Cartesian system, cylinder $12y$ has its axis along the $y$ axis and cylinder $12z$ has its axis along the $z$ axis. The associated liquid reservoirs for each of these systems $10x$, $10y$, and $10z$, respectively, are each connected in such a fashion that the output from the vent channels such as the channels 19 and 20 in the system of FIG. 1 is fed to a pump to be recirculated back to the liquid reservoir. This is indicated in FIG. 2 by the connection of pumps $50x$, $50y$, and $50z$ in the schematic showing.

Each of the sensing cylinders is connected so as to have its differential output pressure measured by a fluidic differential pressure sensor such as indicated by the blocks $40x$, $40y$, and $40z$ for each of the axes respectively. As in the system of FIG. 1, this differential pressure sensor is supplied by its associated gas source $37x$, $37y$, and $37z$, respectively. The differential pressure sensors each have an output which is a pressure signal in each of the two output conduits 41 and 42 as shown in FIG. 1. This dual or polar pressure signal for each axis is indicated by the single vector arrows $S_x$, $S_y$, and $S_z$, which is connected in turn by conduits 51, 52, and 53 for the $x$, $y$, and $z$ axis systems, respectively, to a utilization device 54. Each of the conduits, 51, 52, and 53, it will be understood, in fact represents a double conduit line so that the signals from channels 41 and 42 in the sensor 40 in FIG. 1 may be utilized to give plus and minus polarity to the scalar component of acceleration along each of the axes $x$, $y$, and $z$. These six pressure signals are then applied through conduits 51, 52, and 53 to the utilization device 54, which may be any convenient means for resolving the scalar components of the vector acceleration into vector magnitude and the three cosine angles to give vector direction. As is well known, the vector magnitude will be given by the square root of the sum of the squares of its orthogonal scaler components, whereas the cosine of the angle between the vector and any given orthogonal axis is equal to the scalar component along that axis divided by the vector magnitude which in turn is derived from the relationship stated last above. This computation may, if desired, be carried out by fluidic or any other conventional means in the utilization circuitry 54 or it may be desired simply to utilize the scalar components of the vector acceleration for direct control purposes.

In spite of the additional complexity, the system shown in FIG. 2 has most of the advantages described for the system of FIG. 1. The three systems for each of the three axes are preferably complete duplicates of each other with no connection between them, in order to avoid spurious coupling. It will, of course be understood, however, that the pumps for each of the three systems can be driven from the common electrical or hydraulic or other power system of the vehicle in which the vector accelerometer is to be used. The exact nature of the utilization device 54 will, as pointed out above, depend upon the particular purpose and system or vehicle in which the accelerometer is to be used. Therefore, the details of the utilization device 54 per se do not form a part of the present invention.

While specific preferred embodiments of the invention have been described by way of illustration only, it will be understood that the invention is capable of many other specific embodiments and modifications and is defined solely by the following claims.

What is claimed is:

1. A fluidic accelerometer comprising a completely filled liquid container means having a pair of oppositely disposed liquid inlet ports and a pair of oppositely disposed liquid outlet ports, each pair positioned on an axis parallel to which acceleration is to be measured, a differential pressure measuring means operatively connected to said oppositely disposed liquid outlet means, said differential pressure measuring means providing an output signal which is a measure of the pressure gradient developed along said axis in said liquid container means when it is subject to an acceleration, supply means operatively connected to said pair of inlet ports to supply liquid to said container at a predetermined supply pressure which is greater than the pressure developed in said container by the maximum acceleration which the system is designed to measure, and means to prevent recirculation of liquid between said oppositely disposed liquid inlet ports to said container, wherein:

(a) said container is a right cylinder having said pairs of inlet and outlet ports in opposite ends thereof;
   (b) said differential pressure measuring means is a fluidic amplifier having two opposed control jet inlets respectively connected to said outlet ports in said cylinder;
   (c) said supply means is a common pressurized tank of liquid; and,
   (d) said means to prevent recirculation comprises a two control fluid amplifier connected in the flow path from said supply means to each of said inlet ports, one of said control jets of each amplifier being connected to said supply pressure as a bias and the opposed control jet of each amplifier being connected to sense the pressure at the end of the cylinder to which the output from its amplifier is connected, each of said amplifiers being arranged and connected to supply more liquid to its end of the cylinder than the other amplifier supplies when the low end of the pressure gradient in the cylinder is at its end.

2. A fluidic accelerometer comprising:
(a) a cylindrical container adapted to be filled with liquid, said container having an inlet port and an outlet port in each end wall thereof;
(b) differential pressure measuring means operatively connected to the output port in each of said end walls to provide an output signal which is a measure of the liquid pressure gradient developed along the axis of said cylinder when liquid therein is subjected to an acceleration;
(c) common liquid supply means operatively connected to the inlet port in each of said end walls to supply liquid to said container at a predetermined supply pressure which is greater than the maximum pressure developed in said container by the maximum acceleration which said system is intended to measure;
(d) fluid amplifier means connected between each of said inlet ports and said common liquid supply means, said amplifier means being operatively arranged and connected to prevent recirculation of liquid between said oppositely disposed liquid inlet ports in said cylinder, each of said amplifier means having a pair of opposed control jet orifices, one of which is connected to sense the pressure at the end of the cylinder to which said amplifier is connected, whereby liquid flowing from said common supply means through said amplifiers to said cylinder is diverted proportionately either into or away from said cylinder in response to relative magnitudes of the pressures applied to said pair of opposed control jet orifices.

References Cited

UNITED STATES PATENTS

| 3,293,920 | 12/1966 | Geipel et al. | 73—515 |
| 3,310,985 | 3/1967 | Belsterling et al. | 73—515 |
| 3,324,730 | 6/1967 | Bowles | 73—515 |
| 3,354,725 | 11/1967 | Canfield | 73—516 |

RICHARD C. QUEISSER, Primary Examiner

JOHN R. FLANAGAN, Assistant Examiner